United States Patent [19]

Bonaquist et al.

[11] Patent Number: 5,329,443
[45] Date of Patent: Jul. 12, 1994

[54] TWO-PHASE METHOD FOR REAL TIME PROCESS CONTROL

[75] Inventors: Dante P. Bonaquist, Grand Island; Michael D. Jordan, Williamsville; Mark H. Karwan, Buffalo, all of N.Y.

[73] Assignee: Praxair Technology, Inc., Danbury, Conn.

[21] Appl. No.: 899,477

[22] Filed: Jun. 16, 1992

[51] Int. Cl.$^5$ .............................................. G06F 15/46
[52] U.S. Cl. .................................... 364/153; 364/148; 364/151
[58] Field of Search ............... 364/153, 148, 149, 150, 364/151, 152, 154–156, 158, 172

[56] References Cited

U.S. PATENT DOCUMENTS

| | | | |
|---|---|---|---|
| 4,349,869 | 9/1982 | Prett et al. | 364/159 |
| 4,358,822 | 11/1982 | Sanchez | 364/153 |
| 4,616,308 | 10/1986 | Morshedi et al. | 364/159 |
| 4,736,316 | 4/1988 | Wallman | 364/153 |
| 5,050,064 | 9/1991 | Mayhew | 364/172 |

Primary Examiner—Jerry Smith
Assistant Examiner—Cameron H. Tousi
Attorney, Agent, or Firm—Cornelius F. O'Brien

[57] ABSTRACT

A method of process control using linear programming models to implement the control of one or more controlled variables to maintain a desired target value over a given time horizon. The controlled variables are controlled by a process controller which adjusts manipulated variables in real time. The method uses two linear programming models with the second model computed from the solution of the first in which the absolute value of the deviation for each controlled variable from its target value over a specified time horizon is computed. This permits the controlled variables to be adjusted with the changes in the manipulated variables held to a minimum over the time horizon under control.

10 Claims, 8 Drawing Sheets

TWO-PHASE METHOD FOR REAL TIME PROCESS CONTROL

This invention relates to a method for controlling the operation of a process using linear programming models configured to provide accountability for system constraints as well as unmeasured disturbances on the process.

The use of linear programming models to implement the control of a process is now conventional. Linear programming models which mathematically define the relationship between the future changes of controlled variables and current and past changes in manipulated variables are presently in use to enhance the operation of a process controller. A controlled variable is a process variable that is targeted to be maintained at a desired set point whereas manipulated variables are process variables which are adjusted to drive the controlled variables to their target values. In any commercial process disturbances will occur external to the process which may cause instability, decrease efficiency and change product quality unless the process is controlled to respond in real time to the unmeasured disturbances. An unmeasured disturbance to the process may arise e.g., from an ambient temperature change or from an unexpected change in demand for products. In addition, such process has system constraints such as temperature, pressure and flow rate which place limits on the process variables and must also be accounted for during control of the process.

Dynamic matrix control is a process control methodology using process models to compute adjustments in manipulated variables based on a prediction of future changes in controlled variables. The basic concept of dynamic matrix control is to use known time domain step response process models to determine the changes in manipulated variables to minimize or maximize a performance index over a specified time horizon. A time sequence of manipulated variable changes for each manipulated variable is computed based on the response of the process predicted by the time domain step response models such that the performance index is optimized.

Two U.S. patents have been issued covering two embodiments of dynamic matrix control. U.S. Pat. No. 4,349,869 is a dynamic matrix control system where the changes in manipulated variables required to minimize or maximize some performance index over time are computed by a mathematical least squares approach. The principle deficiency of this approach is that system constraints on the process controlled variables cannot be handled explicitly by the least squares technique of computing manipulated variable changes or moves. Because of this limitation, it is difficult to drive controlled variables toward an upper or lower limit which may define the optimum steady state operating conditions for the process since there is no explicit guarantee that the limits will not be violated during a transient condition produced when manipulated variables are adjusted.

U.S. Pat. No. 4,616,308 is an improved form of dynamic matrix control where the least squares method of computing changes in manipulated variables required to minimize or maximize some performance index described in U.S. Pat. No. 4,349,869 is replaced by either a quadratic or linear programming method. Using either of these methods, system constraints on the controlled variables can be explicitly handled. The manipulated variable moves are guaranteed not to cause transients that cause the controlled variables to violate upper or lower limits subject to the condition that the time domain step response process models represent the dynamic response of the process exactly and no unmeasured disturbances are imposed on the process.

In fact, time domain step response process models can never represent the dynamic response of the process exactly. Additionally, disturbances which are unmeasured and not taken into account by any process model may cause real time instability in the process control. Because of these factors, the manipulated variable moves computed by the least squares, quadratic programming or linear programming methods must be updated periodically. One procedure is to ascertain the state of the process as defined by the controlled variables, compute the time sequence of moves for each manipulated variable, wait for some interval of time, ascertain the state of the process again and recompute the time sequence of moves for each manipulated variable.

The two embodiments of dynamic matrix control described in U.S. Pat. Nos. 4,349,869 and 4,616,308 employ process models that do not account for real time unmeasured disturbances entering the process after the state of the process is initially ascertained. An additional problematic issue associated with the practical implementation of dynamic matrix control with imperfect process models and unmeasured disturbances is that the time sequence of moves for each manipulated variable computed by any of the methods described above tends to be extremely aggressive in achieving the objective of minimizing or maximizing the performance index. Large and frequent manipulated variable moves are common. Aside from the aesthetic concerns of operating personnel, the closed loop stability of the process is jeopardized when the controller exhibits such aggressiveness. This is true particularly when the accuracy of the process models is limited for some reason. U.S. Pat. No. 4,616,308 mathematically describes a concept known to those skilled in the art as move suppression. Move suppression penalizes the performance index based on the magnitude of any changes in manipulated variables from their current values in the time sequence of manipulated variable changes computed for each manipulated variable. Therefore, a change in a given manipulated variable in the sequence from its initial value will not be computed unless the cost of this change as defined by a move suppression factor or weight is exceeded by the benefit of the change in terms of an improvement in the performance index. The net result of using move suppression is to modify the performance index which is to be minimized or maximized over a defined time horizon such that changes in manipulated variables from their current values in the time sequence of manipulated variable changes cause the value of the performance index to change in opposition to the unmodified performance index. The amount of change in the unmodified performance index cannot be ascertained beforehand.

The fundamental objective of move suppression is to improve the closed loop stability of the process by reducing the aggressive tendency of a dynamic matrix controller to make large and possibly frequent changes in some or all of the manipulated variables. Assuming for the moment, that the time domain step response models represented the process response exactly and that the process models accounted for all disturbances entering the process, then the closed loop stability would be less of a concern. However, the time domain step response models actually employed in dynamic matrix control are the recursive or difference equation form of a system of linear differential equations. The extent to which the behavior of real physical systems can be modeled by a set of linear differential equations is limited. Although more rigorous models could be constructed, the usefulness of a control technique based on more complex process models is limited by the ability to fit the response of the process to those models and to compute the manipulated variable moves based on those models. One way of viewing the concept of move suppression is in terms of the level of confidence that can be placed on the accuracy of the time domain step response models. If the process models are very accurate, then the effect of move suppression is to degrade the quality of control. In other words, if the process models were accurate, less move suppression would be required to maintain the closed loop stability of the process. This can be viewed as a trade off between closed loop stability and optimizing the controller performance, which is made by the introduction of move suppression.

The trade off between closed loop stability and optimization of the performance of the controller, as measured by the performance index, is currently practiced by modification of the performance index as described previously. The degree to which the manipulated variable moves are suppressed over those that would be computed using the unmodified performance index is a function of the relative value of the move suppression factors or weights used to penalize the modified performance index. The adjustment of the move suppression weights is accomplished by online-tuning of the controller. It is difficult to relate the magnitude of the move suppression weights to the improvement in closed loop stability or the degradation of the quality of control. Selection of the move suppression weights is subjective and is usually based on observing the closed loop response of the process during online tuning of the controller.

SUMMARY OF THE INVENTION

In accordance with the method of the present invention, a process, having one or more manipulated variables and one or more controlled variables with the controlled variables having target values which depend upon the adjusted value of said manipulated variables, is controlled in real time through a process controller under the operation of a computer with the method of control comprising the steps of:

establishing a first performance index to compute the absolute value of the deviation for each controlled variable in the process from its target value over a specified time horizon;

generating a first linear programming model the solution of which will minimize said first performance index;

solving said first linear programming model;

establishing a second performance index to compute the absolute change in the value of each manipulated variable from its previous value for each controlled variable over a specified time interval;

generating a second linear programming model the solution of which will minimize said second performance index;

incorporating at least one dynamic constraint in said second linear programming model computed from the solution of said first linear programming model and being equal to a value above zero and of no greater than the value of the solution of said first linear programming model plus a predetermined amount;

solving said second linear programming model with said dynamic constraint; and adjusting the manipulated variables in response to the solution of said second linear programming model to drive said controlled variables toward their target values.

By using a two phase linear programming model the time sequences of manipulated variable changes for each manipulated variable improves the closed loop stability of the process in comparison to those time sequences computed by the first phase linear programming model. In the first phase, the value of a performance index is minimized or maximized subject to system constraints and/or limits on the manipulated and controlled variables. The system constraints and/or limits may be derived from a physical understanding of the process capabilities or from data collected from a prior operation or from simulated testing or they can be subjective. Once derived, they are fixed for a specific time interval and used as fixed limitations in the solution of the performance index in the first phase over a specific time horizon. The solution of the linear program for the first phase computes the absolute value of the deviation of the controlled variables from their target values over a specified time horizon subject to fixed system constraints or limits.

Because of the possible existence of alternate optimal solutions to the phase one linear program, it is preferable for the phase one linear program to optimize the first performance index plus a small fraction of the second performance index. This strategy allows for a valid measurement of the value of solving the phase two linear program, i.e. the comparison of the solutions of the phase one and phase two linear programs as measured by the second performance index is valid.

In the second phase, the value of its performance index is minimized or maximized subject to a dynamic constraint which is related to the solution of the first phase linear programming model. Thus the second performance index is minimized or maximized subject to the system constraints in the first phase solution and to a dynamic constraint based upon the first phase solution. For example, the dynamic constraint for the second phase can be equal or less than the value of the solution of the first linear programming model plus a predetermined amount. This predetermined amount can be estimated based upon experience or computed based on additional information from e.g. past optimum analysis.

A fundamental advantage of the present invention resides in the improvement to closed loop stability of the process under control because the time sequence of manipulated variable changes for such manipulated variables computed from the second phase linear programming model reduces the aggressive tendency of a dynamic matrix controller to make large and possible frequent changes in some or all of the manipulated variables.

BRIEF DESCRIPTION OF THE DRAWINGS

Other advantages of the present invention will become apparent from the following detailed description of the invention when read in conjunction with the following drawings of which.

DETAILED DESCRIPTION OF THE INVENTION

Figure 1:
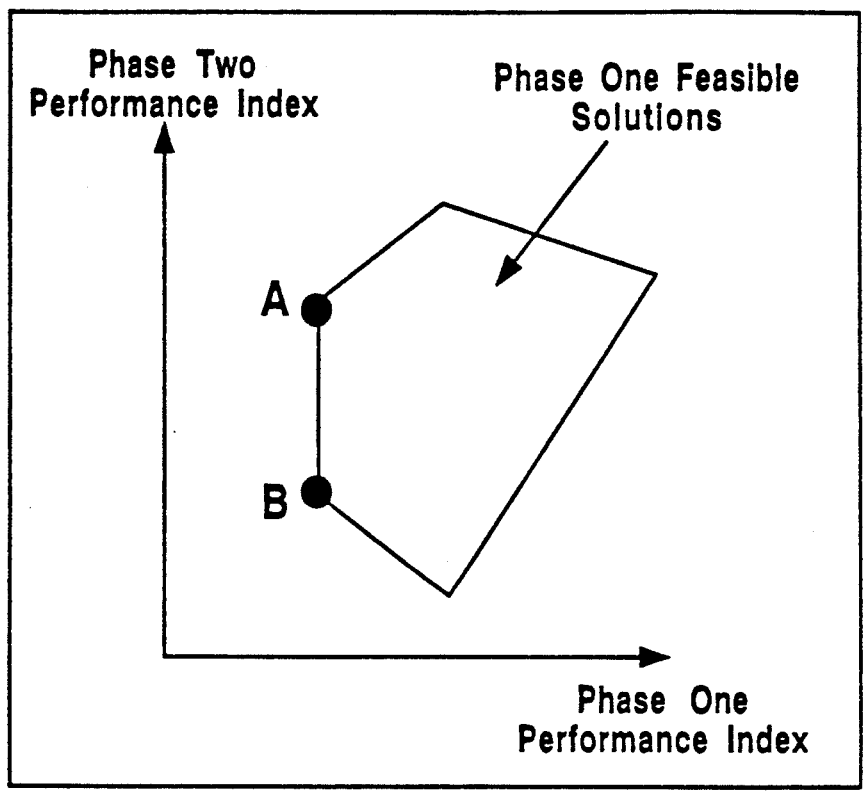
FIG. 1 is a graphical illustration of a concept underlying the preferred embodiment of the present invention for projecting all feasible solutions of the first phase linear programming model in the performance index space governing the operation of the process.

The two phase linear programming method for process control in accordance with the present invention computes the time sequence of manipulated variable changes for each manipulated variable required to achieve a defined control objective. The solution of the first phase linear programming model will optimize a performance index that computes the absolute value of the deviation of controlled variables from their target values over a specified time horizon.

A typical form of a performance index for computing the deviation of the controlled variables in the first phase of the present invention is as follows:

$$\text{Minimize} \quad \sum_{p=1}^{P} \sum_{n=0}^{N} s^p_{t+n}(\alpha^p_{t+n} + \beta^p_{t+n}) \quad (100)$$

$$y^p_{t+n} = y^{p'}_{t+n} + (\alpha^p_{t+n} - \beta^p_{t+n}) \quad (101)$$

Where:
- $y^p_{t+n}$    value of controlled variable p at time t + n
- $y^{p'}_{t+n}$    target for controlled variable p at time t + n
- $\alpha^p_{t+n}$    positive deviation of controlled variable p from target at time t + n
- $\beta^p_{t+n}$    negative deviation of controlled variable p from target at time t + n
- $s^p_{t+n}$    weight on deviations of controlled variable p from target at time t + n Those familiar with linear programming will recognize the above formulation as a performance index that computes the absolute value of the deviation of controlled variables from their target values over a specified time horizon. The weights are used to assign greater significance to deviations in certain controlled variables in the performance index. The weights can be used to selectively improve the performance of a process controller with respect to some of the controlled variables.

A typical form of a performance index for the second phase linear programming model of the present invention is as follows:

$$\text{Minimize} \quad \sum_{r=1}^{R} \sum_{n=0}^{N} w^r_{t+n}(u^r_{t+n} + v^r_{t+n}) \quad (102)$$

$$\Delta x^r_{t+n} = x^r_{t+n} - x^r_{t+n-1} \quad (103)$$

$$\Delta x^r_{t+n} = u^r_{t+n} - v^r_{t+n} \quad (104)$$

Where:
- $\Delta x^r_{t+n}$    change in manipulated variable r from previous value at time t + n
- $x^r_{t+n}$    value of manipulated variable r at time t + n
- $x^r_{t+n-1}$    value of manipulated variable r at time t + n − 1 otherwise known as the previous value of manipulated variable r at time t + n
- $u^r_{t+n}$    positive change in manipulated variable r at time t + n
- $v^r_{t+n}$    negative change in manipulated variable r at time t + n
- $v^r_{t+n}$    negative change in manipulated variable r at time t + n
- $w^r_{t+n}$    weight on changes in manipulated variable r at time t + n Those familiar with linear programming will recognize the above formulation as a performance index that computes the absolute change in the value of a manipulated variable from its previous value. The weights are used to assign a greater significance to changes in certain manipulated variables in the performance index. The weights can be used to selectively reduce the size and possibly number of manipulated variable changes in some of the manipulated variables.

Since there are many feasible alternate solutions to a linear programming model, it is possible to anticipate the possibility of alternate solutions to the first phase model and select a single solution from those solutions which would be preferred based on the second phase performance Index. This concept is illustrated by FIG. 1. FIG. 1 is a projection of all feasible solutions to the first phase linear programming model in performance index space. Points A and B are extreme points of a set of feasible solutions to the first phase linear programming problem having the same value of the phase one performance index.

Since the phase one performance index is to be minimized by solution of the phase one linear programming model and the phase two performance index is to be minimized by solution of the phase two linear programming model, solution B is preferred over all other solutions including solution A. Solution B can be guaranteed to be selected in phase one by including the performance index to be used in phase two as part of the performance index minimized by solution of the phase one linear programming model.

In accordance with the above concept the objective function for the first phase linear programming model can be expressed as follows:

$$\text{Minimize} \sum_{p=1}^{P} \sum_{n=0}^{N} s_{t+n}^p(\alpha_{t+n}^p + \beta_{t+n}^p) + \quad (105)$$

$$\epsilon \left[ \sum_{r=1}^{R} \sum_{n=0}^{N} w_{t+n}^r(u_{t+n}^r + v_{t+n}^r) \right]$$

$\epsilon > 0$ arbitrarily small

Similarly the objective function for phase two is as follows:

$$\text{Minimize} \sum_{r=1}^{R} \sum_{n=0}^{N} w_{t+n}^r(u_{t+n}^r + v_{t+n}^r) + \quad (106)$$

$$\epsilon \left[ \sum_{p=1}^{P} \sum_{n=0}^{N} s_{t+n}^p(\alpha_{t+n}^p + \beta_{t+n}^p) \right]$$

Linear dynamic process models in the form of recursive difference equations are currently used to relate the future changes in a process output to current and past changes in process outputs and process inputs including both manipulated variables and disturbances. Such models are used to construct a series of equality constraints that comprise the bulk of the structure of the phase one and phase two linear programming models as algebraic equations. The general form of such process models is shown below. These models are identified by using standard linear regression techniques on experimental data obtained from the process to be controlled or first principles models of that process or any other suitable source. The model identification methods are not part of the invention.

$$y_{t+n}^p = y_{t+n-1}^p + \Delta y_{t+n}^p \quad p,n \quad (107)$$

$$\Delta y_{t+n}^p = \sum_{r=1}^{R} \Delta y_{t+n-k}^{p,r} + \sum_{d=1}^{D} \Delta f_{t+n}^{p,d} \quad p,n \quad (108)$$

$$\Delta y_{t+n}^{p,r} = \sum_{k=1}^{K} a_{t+n-k}^{p,r} \Delta y_{t+n-i}^{p,r} + \sum_{i=0}^{I} b_{t+n-i}^{p,r} \Delta x_{t+n-i}^r \quad p,r,n \quad (109)$$

$$\Delta f_{t+n}^{p,d} = \sum_{k=1}^{K} c_{t+n-k}^{p,d} \Delta f_{t+n-i}^{p,d} + \sum_{i=0}^{I} e_{t+n-i}^{p,d} \Delta g_{t+n-i}^d \quad p,d,n \quad (110)$$

Where:
| | |
|---|---|
| $y_{t+n}^p$ | value of controlled variable p at time t + n |
| $y_{t+n-1}^p$ | value of controlled variable p at time t + n − 1 otherwise known as the previous value of the controlled variable p at time t + n |
| $\Delta y_{t+n}^p$ | change in controlled variable p at time t + n |
| $\Delta y_{t+n}^{p,r}$ | contribution to change in controlled variable p from manipulated variable r at time t + n |
| $\Delta f_{t+n}^{p,d}$ | contribution to change in controlled variable p from disturbance variable d at time t + n |
| $\Delta y_{t+n-k}^{p,r}$ | contribution to change in controlled variable p from manipulated variable r at time t + n − k |
| $a_{t+n-k}^{p,r}$ | weight on the contribution to the change in controlled variable p from manipulated variable r at time t + n − k |
| $\Delta x_{t+n-i}^r$ | change in manipulated variable r at time t + n − i |
| $b_{t+n-i}^{p,r}$ | weight on the contribution to the change in controlled variable p from manipulated variable r at time t + n − i |
| $\Delta f_{t+n-k}^{p,d}$ | contribution to the change in controlled variable p from disturbance variable d at time t + n − k |
| $c_{t+n-k}^{p,d}$ | weight on the contribution to the change in controlled variable p from distrurbance variable d at time t + n − k |
| $\Delta g_{t+n-i}^d$ | change in disturbance variable d at time t + n − i |
| $e_{t+n-i}^{p,d}$ | weight on the change in disturbance variable d contributing to a change in controlled variable p at time t + n − i |

The first phase linear programming model is represented by objective function (105) and constraints (107), (108), (109), (110) and the following bounds on the change and value of manipulated and controlled variables.

$$h_{t+n}^r \leq \Delta x_{t+n}^r \leq g_{t+n}^r \quad (111)$$
$$h_{t+n}^p \leq \Delta y_{t+n}^p \leq g_{t+n}^p \quad (112)$$
$$L_{t+n}^r \leq x_{t+n}^r \leq U_{t+n}^r \quad (113)$$
$$L_{t+n}^p \leq y_{t+n}^p \leq U_{t+n}^p \quad (114)$$

Where:
| | |
|---|---|
| $h_{t+n}^r$ | lower bound on change in manipulated variable r at time t + n |
| $g_{t+n}^r$ | upper bound on change in manipulated variable r at time t + n |
| $h_{t+n}^p$ | lower bound on change in manipulated variable p at time t + n |
| $g_{t+n}^p$ | upper bound on change in manipulated variable p at time t + n |
| $L_{t+n}^r$ | lower bound on manipulated variable r at time t + n |
| $U_{t+n}^r$ | upper bound on manipulated variable r at time t + n |
| $L_{t+n}^p$ | lower bound on controlled variable p at time t + n |
| $U_{t+n}^p$ | upper bound on controlled variable p at time t + n |

The second phase linear programming model is represented by objective function (106) and constraints (107), (108), (109), and (110) and bounds (111), (112), (113), and (114) and the following dynamic constraints derived from the solution of the first phase linear programming model.

$$IAE^p = \sum_{n=0}^{N} s_{t+n}^p(\alpha_{t+n}^p + \beta_{t+n}^p) \quad p \quad (115)$$

$$IAE = \sum_{p=1}^{P} \sum_{n=0}^{N} s_{t+n}^p(\alpha_{t+n}^p + \beta_{t+n}^p) \quad (116)$$

where

IAE$^P$ contribution to phase one performance index from deviation from the target value of controlled variable P IAE phase one performance index value (without $\epsilon$ term)

The following phase two dynamic constraints can be constructed:

$$\sum_{n=0}^{N} \mathscr{I}_{i+n}(\alpha^p_{i+n} + \beta_{i+n}) \leq IAE^P + \Delta IAE^P \quad p \quad (117)$$

$$\sum_{p=1}^{P} \sum_{n=0}^{N} \mathscr{I}_{i+n}(\alpha^p_{i+n} + \beta^p_{i+n}) \leq IAE + \Delta IAE \quad (118)$$

Where:

$\Delta IAE^P$ increase in contribution to phase one performance index from deviations from the target value of controlled variable p allowed for phase two solution $\Delta IAE$ increase in phase one performance index value allowed for phase two solution Typically, $\Delta IAE^P$ would be preferably taken as some fraction of $IAE^P$ computed from the solution of the first phase linear programing model. Alternatively, $\Delta IAE^P$ may be a predetermined value computed by any number of means including, for example, the following.

$$\Delta IAE^P = (N) \Delta^P \quad (119)$$

Where:

N number of time intervals considered in the controller time horizon $\Delta^P$ increase in the contribution to phase one performance index from deviations from the target value of controlled variable p per time interval allowed for phase two solution The first phase linear programming model and the second phase linear programming model are identical in all respects except for the use of different performance indices as described heretofore and the addition of dynamic constraints in the second phase model as above described based on the solution of the first phase model.

Figure 2:
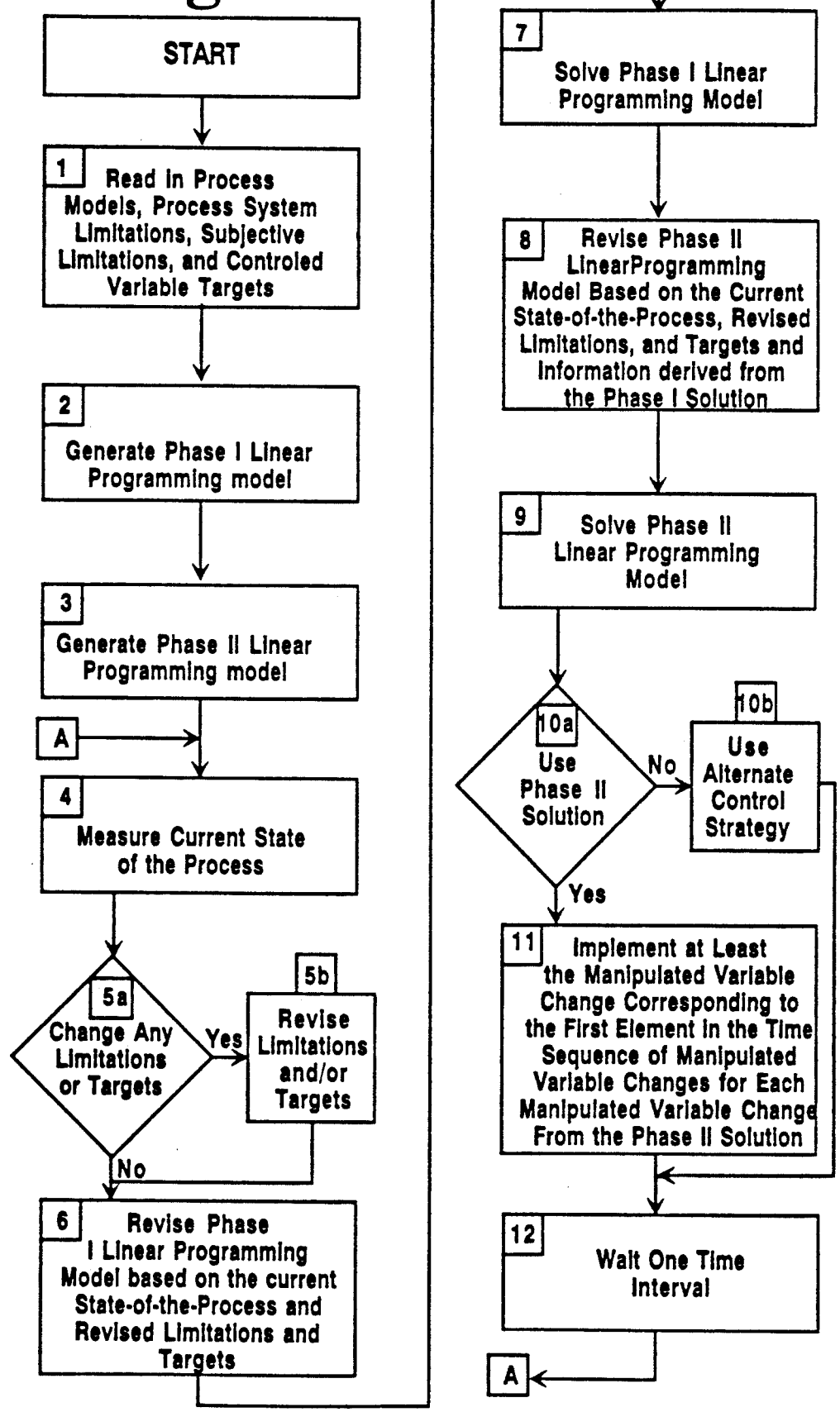
FIG. 2 is a flow chart showing the process control method of the present invention.

Refer now to FIG. 2 which illustrates the invention by means of a flow chart. As indicated in step [1] the process is initiated by reading in the process models into a computer (not shown) for guiding the operation of a process controller (not shown). The process models are given by equations (107), (108), (109) and (110) respectively.

The process models define the relationship between future changes in the controlled variables and current and previous changes in manipulated and disturbance variables. This relationship is represented in the value of weights (a, b, c, e) which are unique for different combinations of controlled variables, manipulated variables and disturbance variables. The values of the weights may be obtained through any number of process identification procedures. One procedure involves introducing a series of changes in manipulated variables and disturbance variables to the process or a first principles process model and recording the response of the controlled variables. The process is not being controlled while these tests are performed. Multilinear regression techniques are used to adjust the value of the weights so that the sum of the squares of the differences between the observed controlled variable response and that predicted by the process models is minimized.

The system constraints in the process control may include process limitations and subjective limitations. Process system limitations identify various physical constraints of the process. For example, a pressure vessel may have a maximum pressure rating that must not be exceeded and the valves cannot be more than completely open or less than completely closed. Motors may have load limitations defined by their manufacturers. These limitations represent either upper or lower bounds on controlled or manipulated variables. Subjective limitations may also exist which identify process system constraints other than those represented by process system limitations that are to be imposed on the operation of the process. These limitations also represent upper or lower bounds on controlled or manipulated variables.

Controlled variable targets are the values of controlled variables that the controller will attempt to achieve. The controller may continue to adjust manipulated variables as long as controlled variable values are different from their targets or are predicted to be different from their targets in the future.

As explained earlier, the phase one (Phase I) linear programming model is represented by algebraic terms including the objective function 105 and constraints 107, 108, 109 and 110 and bounds 111, 112, 113 and 114. Upon completion of step [1] the phase I linear programming model is generated as indicated in step [2] of FIG. 2.

The algebraic representation of the Phase I linear programming model is converted to a representation of the model suitable for optimization. Typically, a matrix form is used for optimization. One example of the matrix form is the MPS (Mathematical Programming System) form which has been adopted as a loose standard by mathematical programming practitioners. Conversion to the MPS form allows the Phase I linear programming model to be read by a variety of commercial linear programming systems. This conversion can readily be accomplished by any computer program written for this purpose and as such is not part of the present invention.

The phase two (Phase II) linear programming model is generated in step 3 and is represented by objective function 106 and constraints 107, 108, 109 and 110 and bounds 111, 112, 113 and 114 and the additional dynamic constraints that are related to the Phase I performance index 117 and 118. Comments regarding conversion of the algebraic form of the Phase I linear programming model to a matrix form are applicable to the Phase II linear programming model as well.

The current state of the process which is measured in step 4 is defined by the most recent values of all controlled, manipulated and disturbance variables. Typically, the initial information representative of these variables can be obtained from a process data acquisition system used to retrieve and store the value of these variables. The data acquisition system and its operation are not part of the invention. Thereafter the current state of the process is updated in each iteration from one time interval to the next.

If necessary, the desired value of the controlled variable targets and limitations during the course of normal operation of the process is revised or adjusted as reflected in steps 5 and 6.

Revising the Phase I linear programming model as indicated in step 6 is based on the most recent current state-of-the-process. To revise limitations and targets involves updating numbers that appear on the right-hand side of constraints and changing bounds. This is usually done without the need to regenerate the Phase I linear programming model therefore saving some computer time. Commercial linear programming systems usually have some facility for making such revisions.

Solving the Phase I linear programming model as indicated in step 7 involves optimizing the objective function for Phase I (105) subject to the constraints and bounds that have been defined. A commercial linear programming system will typically be employed for this purpose. One way to solve the Phase I linear programming model is to use a primal simplex algorithm. In the primal simplex algorithm, a basic feasible solution to the expanded primal problem is maintained at each step of the iterative process of the simplex method. A detailed description of the simplex and revised simplex methods is available in any number of linear programming texts such as, for example, Linear Programming and Extensions, by G. B. Danztig Princeton University Press 1963. The dual simplex algorithm may be used instead of the primal simplex algorithm. An algorithm based on interior-point barrier methods may also be used for the optimization.

The solution of the Phase I linear programming model will provide at least the following information:
(a) The value of the objective function.
(b) The activities of variables which are the time sequence of variable changes for each manipulated variable.
(c) The value of right-hand side elements for all constraints.

If the Phase I linear programming model is determined to be infeasible, then it can be made feasible by a temporary relaxation of some bounds or constraints. Feasibility is defined as having at least one set of activities that satisfies all bounds and constraints.

Revising the Phase II linear programming model is identical to revising the Phase I linear programming model as it relates to the current state-of-the-process, revised limitations and revised target values. The right-hand side elements of constraints 117 and 118 found exclusively in the Phase II linear programming model are revised based on information obtained from the Phase I solution. For example, the right-hand side element of constraint 118 consists of a portion identical to the Phase I performance index value with $\epsilon=0$ that is to be allowed in the optimization of the Phase II performance index. The latter portion can be determined in any number of ways, for example:
1. It can be estimated based on the experience of operating personnel or others familiar with the process behavior.
2. It can be the greater of some fraction of the Phase I performance index with $\epsilon=0$ or a fixed number.
3. It can be computed using additional information available from the Phase I solution including reduced costs and marginal values (shadow prices).
4. It can be computed based on information available from post optimum analysis of Phase I including parametric programming.
5. It can be computed based on an external model such as a first principles process model.

Solving the Phase II linear programming model in accordance with step 9 is similar to solving Phase I in step 7. The following are key differences:
(a) The Phase II model is guaranteed to be feasible.
(b) The Phase I solution can serve as a feasible starting point for algorithms applied to Phase II thereby minimizing computational effort.

The solution of Phase II provides similar information as provided in the solution of Phase I.

To determine if the Phase II solution represents an acceptable control strategy, the Phase II solution is analyzed in step 10 against a set of relevant heuristics and if the Phase II solution is found to be deficient for any reason the Phase I linear programming model will be revised.

Although the solution of Phase II contains the activities of decision variables which are the time sequence of manipulated variable changes for each manipulated variable starting with the present and extending out in time for some number of time intervals, preferably only the first element of the time sequence for each manipulated variable is implemented.

Steps 4, 5, 6, 7, 8, 9, 10 and 11 will be repeated after waiting one time interval. If the first element in a subsequent time interval iteration has the same value as in the preceding time interval then step 11 is implemented by inaction. The length of the time interval is usually related to the fundamental dynamic response of the process under control. If some components of this response are fast, the length of a time interval will be short.

Figure 3:
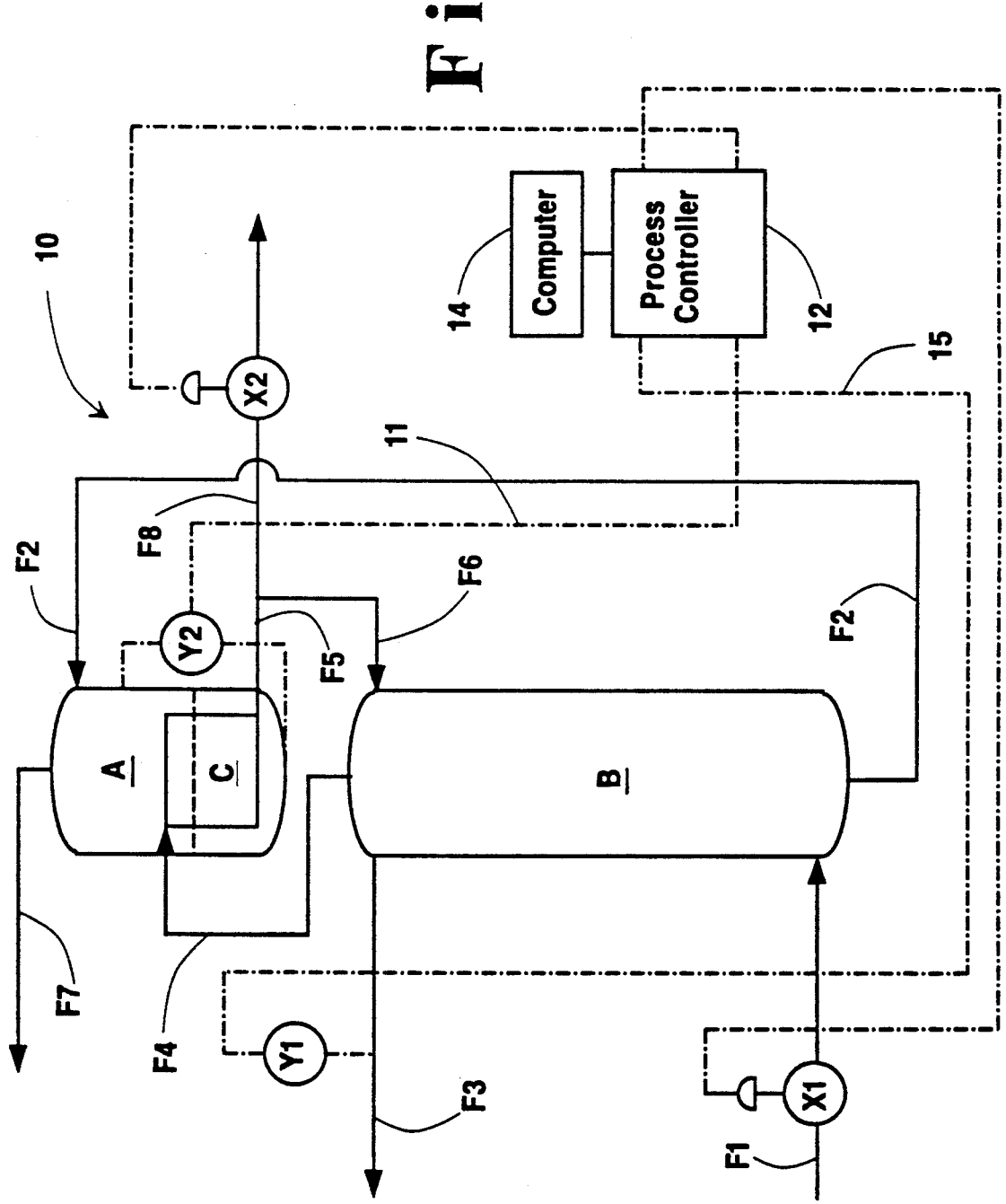
FIG. 3 is a schematic representation of a single column nitrogen plant having two manipulated variables adjusted by a controller under the control guidance of a computer to provide control over two controlled variables.

The invention can be more readily appreciated by comparing the implementation of the linear programming solution from phase one to the implementation of the linear programming solution using phase two. A schematic representation of a single column nitrogen plant operated by a computer controlled model based controller is shown in FIG. 3. The simplified air separation system as shown in FIG. 3 is designed to produce a flow of high purity nitrogen F3 having a specified target purity of 99.99% from an incoming feedstream of air F1 with 80% $N_2$. The feedstream of air F1 is prepurified and cryogenically cooled upstream of valve X1 to a temperature of about 90° K. and to a pressure of between 60-100 lbs. Upon passing through valve X1 the feedstream F1 expands separating into liquid and vapor. The vaporized air rises in column B and the liquid effluent is discharged from the bottom of column B as stream F2. The discharged stream F2 comprises about 40% $O_2$ and 60% $N_2$. Column B includes a multiplicity of standard separator trays (not shown) to assure maximum gas liquid contact between the rising air in the column and a stream of liquid nitrogen F6 which is fed into the top of the column B. The stream F2 discharged from the column B is fed into a vessel A containing a condenser C. Condenser C condenses a vaporized nitrogen stream F4 from column B into liquid stream F5. Stream F5 is divided into stream F6 which is fed into column B and an output stream FS. Valve X2 controls the discharge of the liquid output stream F8 from condenser C. The condensor liquid level in vessel A is detected by a sensor Y2 which supplies an output signal 11 to the controller 12 which is, in turn, controlled by a computer 14. The combination of computer 14 and controller 12 is sometimes referred to as a "model based controller". The controller 12 also receives an input sensing signal 15 from the sensor Y1 which detects the purity of the output nitrogen stream F3. The valves X1 and X2 are adjusted by the controller 12 and are referred to as the manipulated variables to conform to the terminology used heretofore. In the system of FIG. 3 Y1 senses the composition of stream F3 and represents one controlled variable while Y2 senses the condenser liquid level and represents a second controlled variable. Y1 is an open loop stable variable while Y2 is an open loop unstable variable.

Figure 4:
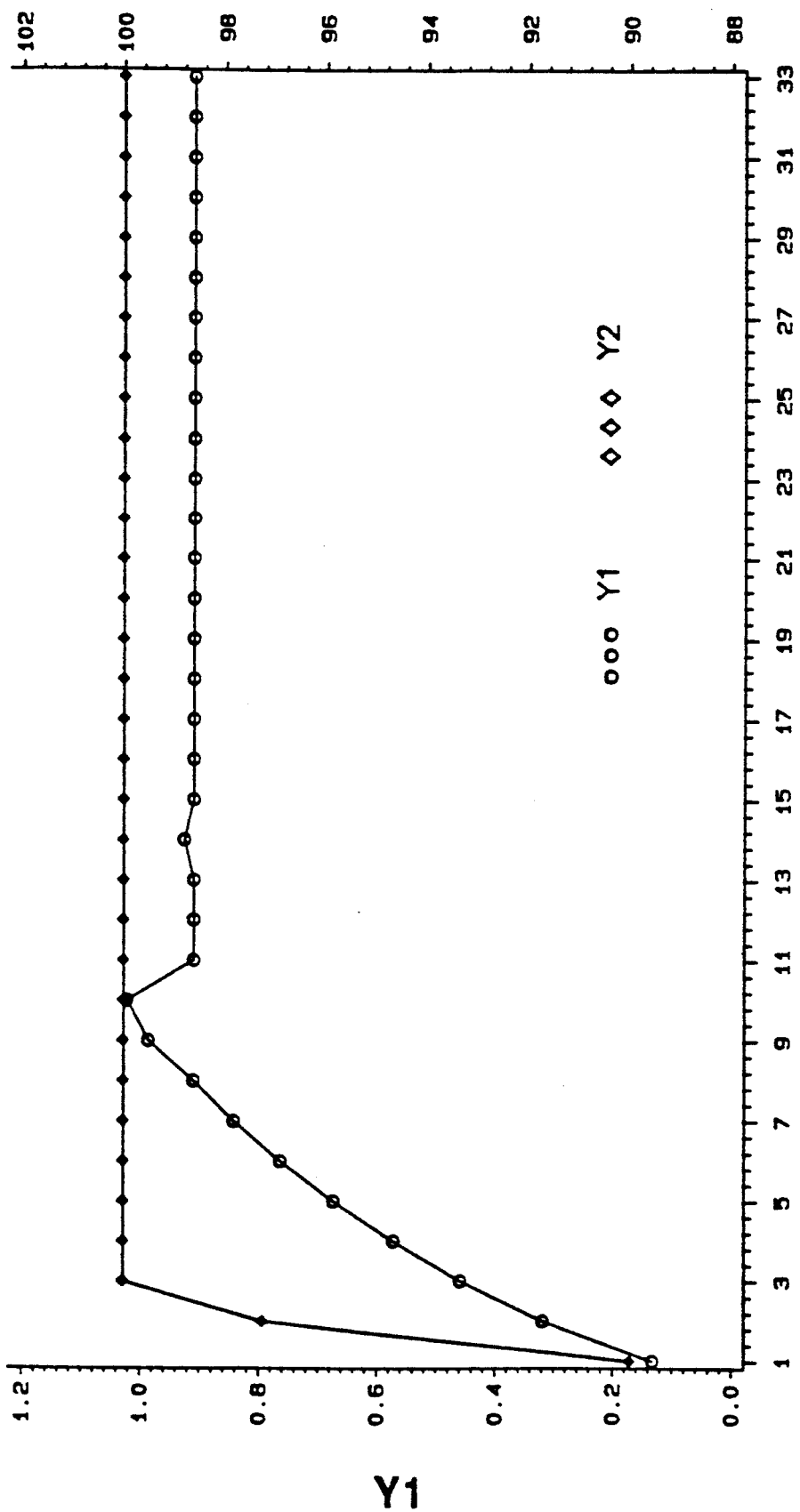
FIG. 4 is a graphical representation of the response of the controlled variables in the nitrogen plant of FIG. 3 to changes in the manipulated variables using only phase one of the subject invention for control implementation.
Figure 5:
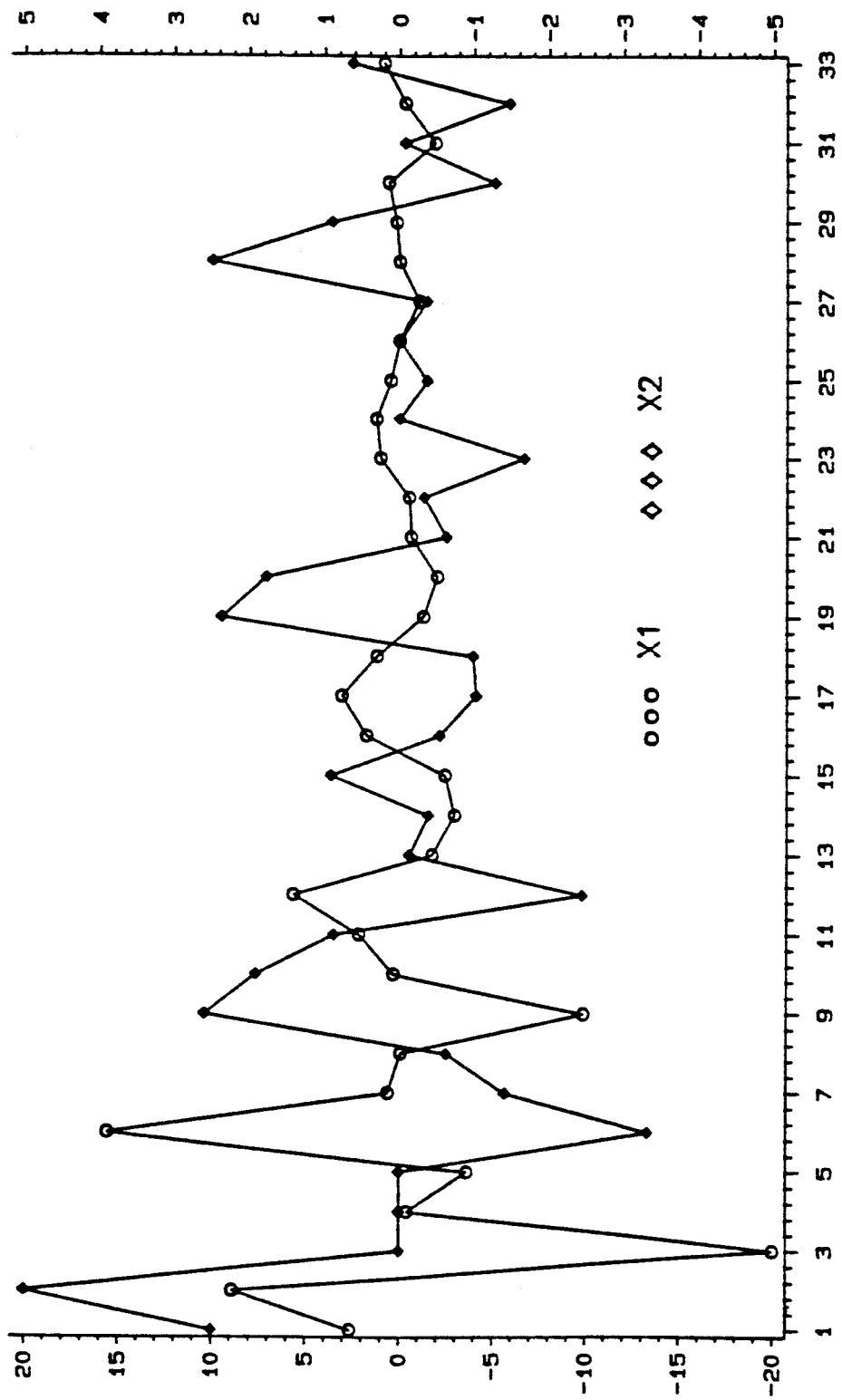
FIG. 5 is a graphical representation of the manipulated variable changes corresponding to the response in FIG. 4 when limited to phase one control.
Figure 6:
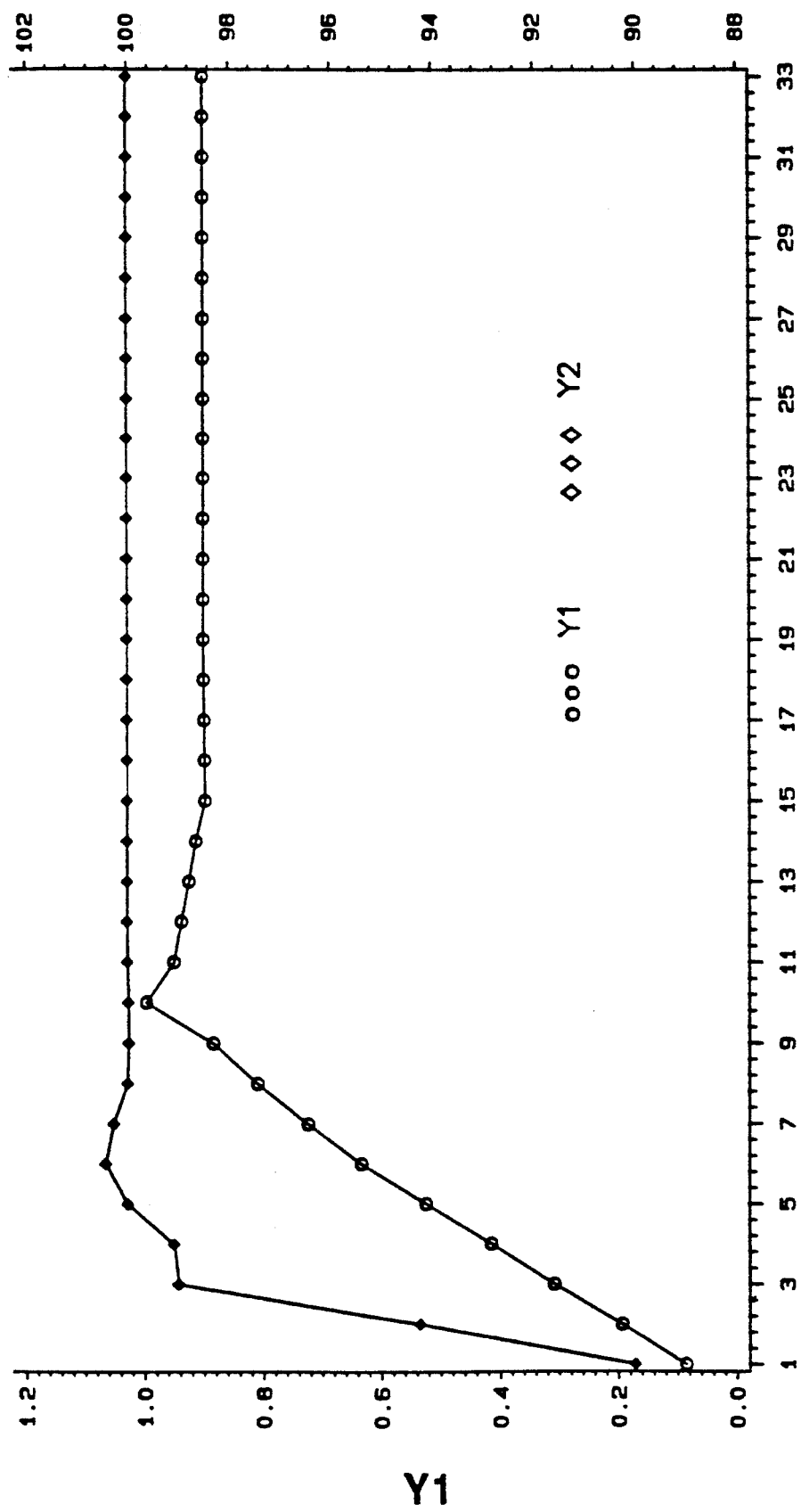
FIG. 6 is a graphical representation of the response of the controlled variables in the nitrogen plant of FIG. 3 to changes in the manipulated variables using the two phase control process of the present invention.
Figure 7:
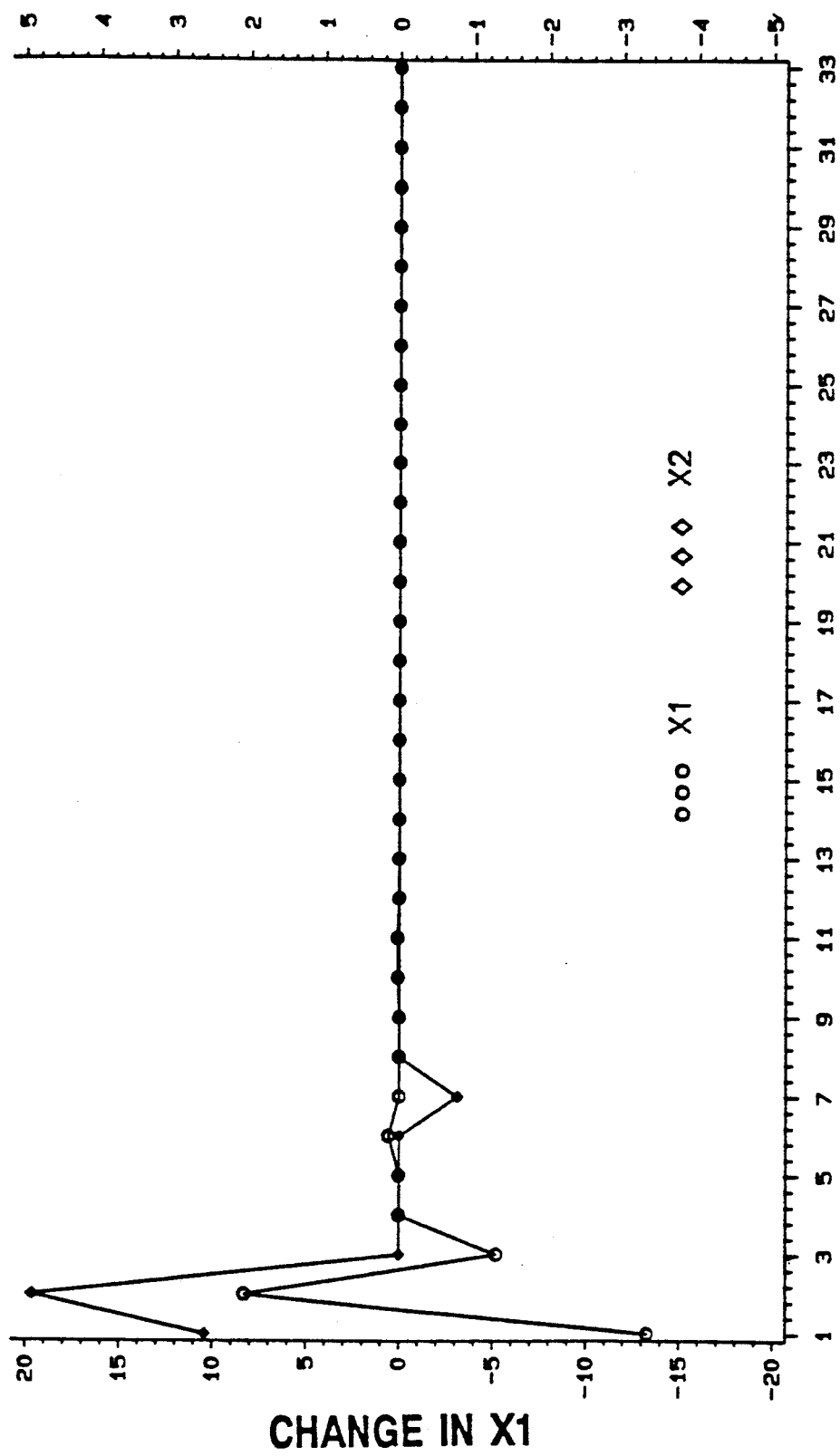
FIG. 7 is a graphical representation of the manipulated variable changes corresponding to the response in FIG. 6 using the two phase control process of the present invention.

Using the two phase linear programming method of the present invention and standard multilinear regression techniques to estimate parameters required for the linear dynamic process models in the form of recursive difference equations a comparison is shown between the implementation of the linear programming solution for phase I as exemplified in FIGS. 4 and 5 and for phase II as exemplified in FIGS. 6 and 7 respectively.

The example involves simultaneously increasing the targets for controlled variables Y1 and Y2 at time zero. Initially, the targets values were 0.10 units and 90.0 units respectively. At time zero the target values were changed to 0.92 and 100.0 respectively. It is assumed that the process was at steady state when the changes were made and that no disturbances enter the process following the changes in target values. If an external disturbance does occur, its affect on the system will depend upon whether the disturbance has been predicted in advance or is totally unexpected. A measured disturbance is an anticipated occurance for which a model may be constructed to provide an equality constraint to account for the anticipated variation in response to the disturbance. This may be established empirically or by simulated testing. The constraint is then incorporated into the linear programming model. A change in ambient temperature or humidity is an example of a measured disturbance which can be predicted and modeled to provide a predetermined response causing no deviation in the process output and therefore will have no affect on the state of the process. However, if the disturbance is totally unexpected or if it is a disturbance which could have been measured and modeled but is otherwise left unmeasured so that its affect on the system is unaccounted for, its occurrence will cause a deviation in the current state of the process from the state of the process in the preceding time interval and will be treated by the controller in a reactive manner as it carries out steps 5–12 of the process as enumerated in the flow diagram.

The process models are assumed to represent the process response perfectly. In FIG. 4 both Y1 and Y2 reach their new targets after a time. Y2 reaches its new target first because the dynamic response of Y2 to X1 and X2 changes is inherently faster than that of Y1. Y1 exhibits a minor overshoot of the new target at time period 10. One time period in this example is equal to 3 minutes. The corresponding manipulated variable changes for phase I are shown in FIG. 5. Notice that both manipulated variables are adjusted frequently and that relatively large changes are made. Changes in X2 were limited to 5 units. These limits restricted the size of the change in X2 at time period 2.

FIG. 6 shows the response of Y1 and Y2 to changes in X1 and X2 for implementation of the linear programming solution with phase two as the control strategy. A close comparison of FIGS. 6 and 4 reveal that Y1 and Y2 reach their target values for phase II almost as fast in FIG. 6 as in FIG. 4. However, significantly less control action is required by the phase two solution to produce almost the same controlled variable response. FIG. 7 shows the manipulated variable changes required by the phase two solution. Notice that a few changes in both X1 and X2 are made only during the first 7 time periods and that the changes are generally smaller than those shown in FIG. 5 where the changes continued to be relatively large even after 14 time periods.

Because perfect process models are assumed for this example, it is not possible to quantify the improvement in closed loop stability that results from using the phase two solution over the phase one solution. In fact, it is generally difficult to quantify the improvement in closed loop stability for processes with complex dynamic response. However, one can readily see from this example that the magnitude, frequency and duration of manipulated variable changes are reduced when the phase two solution is used.

Some processes include controlled variables whose dynamic response to some manipulated and disturbance variable changes are not open loop stable. Open loop stability means that a process output will ultimately reach a new steady state value in response to a change in a process input without the need for any control action. The composition of an overhead stream withdrawn from a distillation column is typically an open loop stable variable. The liquid level in the reboiler of a distillation column is an example of a variable that is not typically open loop stable. The process models that relate to variables that are not open loop stable may involve identification of the response of the rate of change of that variable rather that the magnitude of the variable. If such models are used in the controller formulation, integration over time of the rate of change must be performed in order to assign targets and place bounds on that variable. The previous discussion of the phase one and two linear programming models assumes that the controlled variables are open loop stable. The following extensions are required to deal with controlled variables that are not open loop stable.

Those familiar with the concepts and practices of multi-variable process control will recognize that open loop stability will be improved by the invention as it has been described.

Figure 8:
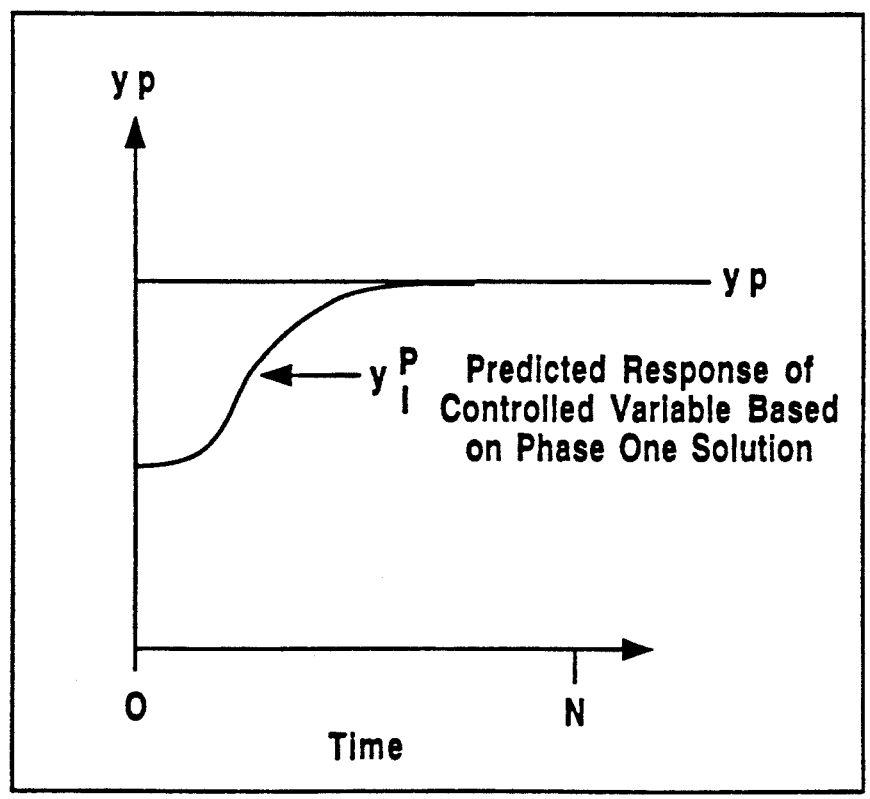
FIG. 8 is a graphical illustration of the result of implementing the time sequence of manipulated variable changes computed by solution of only the phase one linear programming model on one of the controlled variables.

Alternative forms of the additional phase two bounds and constraints can be developed that provide more explicit control on how controller performance, as measured by the phase one performance index, is to be sacrificed for improving the closed loop stability of the process under control. FIG. 8 shows the result of implementing the time sequence of manipulated variable changes computed by solution of the phase one linear programming model on one of the controlled variables. After some number of time intervals, the controlled variable has reached its target value.

Figure 9:
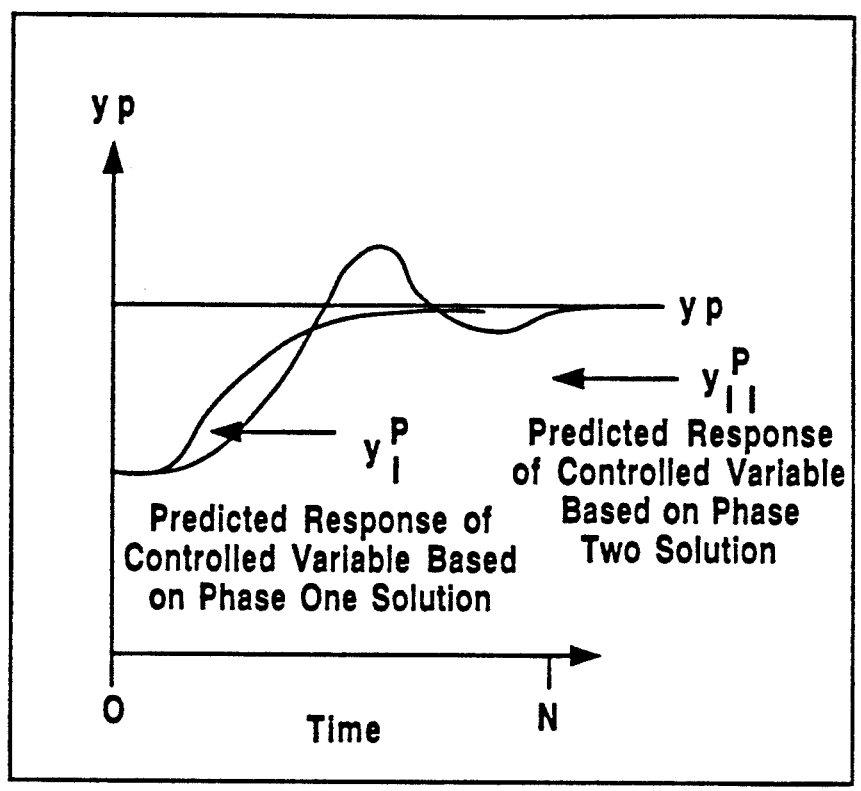
FIG. 9 is a comparable graphical illustration of the result of implementing the time sequence of manipulated variable changes computed by solution of the phase two linear programming method on the same controlled variable of FIG. 7 with only the constraints defined by equations 117 and 118.

FIG. 9 shows a graphical illustration of a possible result of implementing the time sequence of manipulated variable changes computed by solution of the phase two linear programming model on the same controlled variable used in FIG. 8 with the additional second phase constraints defined by equations 117 and 118.

Figure 10:
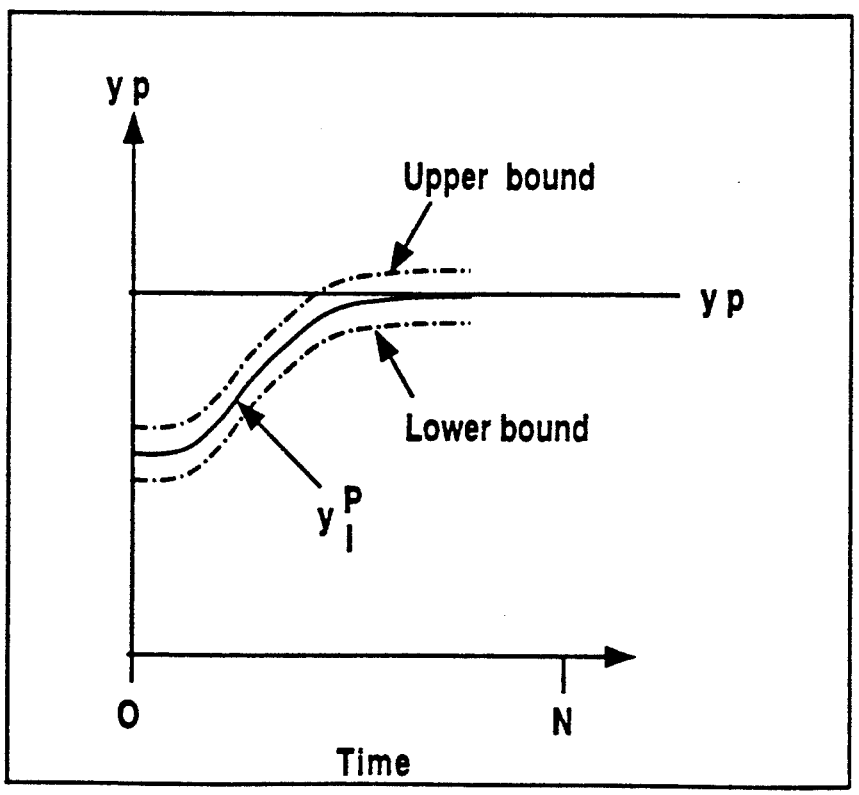
FIG. 10 is a graphical illustration similar to FIG. 9 which includes the application of boundary constraints on the predicted value of the controlled variable from the phase two solution applied in FIG. 8.

The behavior shown in FIG. 9 for the predicted response of the controlled variable based on the phase two solution may be considered undesirable because of the way that the controller has chosen to distribute the increased deviation from the target value in comparison to the behavior predicted for the phase one solution. This distribution can be controlled by applying bounds on the predicted value of the controlled variable at each time interval in the phase two solution that are derived from the predicted value of the controlled variable based on the phase one solution. This concept is illustrated in FIG. 10.

$$y^p_{t+n,I} - \epsilon^p_{t+n} \leq y^p_{t+n} \leq y^p_{t+n,I} + \epsilon^p_{t+n} \quad p,n \quad (120)$$

Where:
- $y^p_{t+n,I}$ — value of controlled variable p at time t + n based on phase one solution.
- $y^p_{t+n}$ — value of controlled variable p at time t + n based on phase two solution
- $\epsilon^p_{t+n}$ — deviation from phase one solution for controlled variable p at time t + n $\epsilon_{t+n}^p$ is typically taken as some fraction of the upper bound minus the lower bound applied to controlled variable p.

$$\epsilon_{t+n}^p = (U_{t+n}^p - L_{t+n}^p)\alpha$$
$$0 \leq \alpha \leq 1$$

Where:
- $U_{t+n}^p$ upper bound applied to control variable p
- $L_{t+n}^p$ lower bound applied to control variable p The combination of the upper and lower bounds on the controlled variables, target value, and the bounds defined by (120) can be used to redefine composite upper and lower bounds of the controlled variable.

$$Uy^p_{t+n} = \text{MIN}[U^p_{t+n}, \text{MAX}(y^p_{t+n}, y_{t+n,I} + \epsilon^p_{t+n})]$$

$$Ly^p_{t+n} = \text{MAX}[L^p_{t+n}, \text{MIN}(y^p_{t+n,I}, y_{t+n} + \epsilon^p_{t+n})].$$

What we claim is:

1. A method for controlling a process for separating air into high purity gas streams having one or more manipulated variables in which one manipulated variable is an air flow stream and one or more controlled variables with one of the controlled variables being the degree of purity of a discharge gas stream and having target values which depend upon the adjusted value of said manipulated variables, with the process controlled in real time using a process controller under the operation of a computer comprising the steps of:

establishing a first performance index to compute the absolute value of the deviation for each controlled variable in the process from its target value over a specified time horizon:

generating a first linear programming model the solution of which will minimize said first performance index;

solving said first linear programming model;

establishing a second performance index to compute the absolute change in the value of each manipulated variable from its previous value over a specified time interval;

generating a second linear programming model the solution of which will minimize said second performance index;

incorporating at least one dynamic constraint in said second linear programming model computed from the solution of said first linear programming model and being equal to a value above zero and of no greater than the value of the solution of said first linear programming model plus a predetermined amount;

solving said second linear programming model with said dynamic constraint; and adjusting the manipulated variables in response to the solution of said second linear programming model to drive said controlled variables toward their target values and thereby causing the air to be separated into a high purity gas stream.

2. A method defined in claim 1 further comprising: using said second performance index for defining an objective function for said first performance index as follows:

Minimize $\sum_{r=1}^{R} \sum_{n=0}^{N} s_{t+n} N s^p_{t+n}(\alpha^p_{t+n} + \beta^p_{t+n}) +$ Minimize $\epsilon \sum_{r=1}^{R} \sum_{n=0}^{N} w^r_{t+n}(u^r_{t+n} + v^r_{t+n})$ wherein:
- $\alpha^p_{t+n}$ = positive deviation of controlled variable p from target at time t + n;
- $\beta^p_{t+n}$ = negative deviation of controlled variable p from target at time t + n;
- $s^p_{t+n}$ = weight on deviation of controlled variable p from target at time t + n;
- $u^r_{t+n}$ = positive change in manipulated variable r at time t + n;
- $v^r_{t+n}$ = negative change in manipulated variable r at time t + n; and
- $w^r_{t+n}$ = weight on changes in manipulated variable r at time t + n
- $\epsilon > 0$.

3. A method as defined in claim 2 wherein said predetermined value is a fraction of the value of the solution of the first phase linear programming value.

4. A method as defined in claim 2 wherein said predetermined value is computed as follows:

$$\Delta IAE^p = (N)\Delta^p \quad (119)$$

Where:
- N number of time intervals considered in the controller time horizon
- $\Delta^p$ increase in the contribution to phase one performance index from deviations from the target value of controlled variable p per time interval allowed for phase two solution.

5. A method as defined in 3 wherein said specified time horizon covers a predetermined number of time intervals.

6. A method as defined in claim 5 further comprising implementing only the manipulated variable charge corresponding to the first element in the time sequence of manipulated variable changes derived from the solution of said second linear programming model.

7. A method as defined in claim 6 further comprising measuring the current state of the process . defined by the most recent values for all variables including controlled and manipulated variables.

8. A method as defined in claim 7 wherein external unmeasured disturbances in each time interval will cause the state of the process to be modified.

9. A method as defined in claim 8 wherein the steps of solving said first linear programming model and said second linear programming model are repeated each time interval based on the updated state of the process.

10. A method as defined in claim 9 wherein the process being controlled is a process for separating air into high purity gas streams with one of the controlled variables being the degree of purity of a discharged gas stream and wherein one of the manipulated variables is the air flow feed stream.

* * * * *

UNITED STATES PATENT AND TRADEMARK OFFICE
CERTIFICATE OF CORRECTION

PATENT NO. : 5,329,443

DATED : July 12, 1994

INVENTOR(S) : Bonaquist, et al.

It is certified that error appears in the above-identified patent and that said Letters Patent is hereby corrected as shown below:

Column 16, line 10,
In claim 2, line 5, delete "st+nN".

Signed and Sealed this

Twenty-ninth Day of August, 1995

Attest:

BRUCE LEHMAN

*Attesting Officer*     *Commissioner of Patents and Trademarks*